United States Patent
Schmidt, Jr.

[11] 3,722,539
[45] Mar. 27, 1973

[54] FLUID FEED CONDUIT FOR PROCESSING APPARATUS

[75] Inventor: Henry Schmidt, Jr., Hinsdale, Ill.

[73] Assignee: Industrial Filter & Pump Mfg. Co., Cicero, Ill.

[22] Filed: Dec. 4, 1970

[21] Appl. No.: 95,297

[52] U.S. Cl. ............... 137/590, 138/140, 239/145
[51] Int. Cl. ................................................ F16l 9/06
[58] Field of Search ..... 55/410, 419; 261/121 R, 122; 138/178, 173, 140 X, 153; 239/145 V, 542; 285/DIG. 4

[56] References Cited

UNITED STATES PATENTS

| | | |
|---|---|---|
| 1,484,575 | 2/1924 | Shulin .......................... 239/542 X |
| 1,676,036 | 7/1928 | Levitt ............................ 138/122 X |
| 2,186,440 | 1/1940 | Williams ...................... 138/122 UX |
| 2,396,059 | 3/1946 | Roberts ............................ 138/122 |
| 3,391,707 | 7/1968 | Riley et al. ..................... 137/590 |
| 3,565,464 | 2/1971 | Wolf ............................ 285/DIG. 4 |

Primary Examiner—William E. Wayner
Attorney—Fidler, Bradley, Patnaude & Lazo

[57] ABSTRACT

A fluid distributing and collecting conduit for transferring liquid under pressure to and from materials confined within a processing vessel comprises a thin walled, helically convoluted rigid tube having a plurality of spatially disposed orifices located in the bottom of the external helical groove. A fine mesh sleeve is tightly fitted over the tube to prevent said material from entering said tube.

8 Claims, 3 Drawing Figures

PATENTED MAR 27 1973　　3,722,539

INVENTOR
HENRY SCHMIDT, JR.

BY *Fidler, Bradley, Patnaude & Sayre*

*Att'ys.*

FLUID FEED CONDUIT FOR PROCESSING APPARATUS

This invention relates to a fluid feed conduit for use in processing vessels, and it more particularly relates to a conduit adapted to be mounted within a process vessel for transferring liquids under pressure into and out of the vessel.

Many different types of process vessels have been employed for processing different materials, such, for example, as powdered or granulated resinous materials, carbon, and like materials. According to one successful technique, a process vessel includes feed and collector conduits mounted within the process vessel for distributing processing liquid under pressure to a granular material confined within the vessel during one part of a process and for conveying liquid from the vessel during another part of the process. Each of the fluid feed conduits comprises a perforated pipe, a spacer grid and a fine mesh sleeve formed of a wire screen and surrounding the grid for preventing the granular material from entering the holes in the pipe during the liquid collection cycle and for evenly distributing the liquid flowing to the material to be processed within the vessel during the liquid feed cycle. Another type feed conduit is disclosed in U. S. Pat. No. 3,391,707.

The distribution and collection conduits of the prior art have several disadvantages. For example, blinding of portions of the conduit is not uncommon and occurs when one or more of the orifices become plugged. Also, they are heavy and expensive to manufacture and transport. In addition, when employing the abovedescribed type of conduit construction in some applications, after repeated use the sleeve would eventually tear and repair or replacement would be necessary. In this regard, in high pressure systems and where heavy resinous materials are used, the fine-mesh sleeve eventually breaks due to the weight of the resin and due to the back pressure exerted on the sleeve during reverse flow of fluid from the pipe. The sleeve is particularly susceptible to breakage where the sleeve extends over a hole in the pipe. Also, even slight irregularities in the surface of the screen forming the sleeve cause wearing and eventual tearing of the sleeve. In this regard, the screen mesh wires of the fine-mesh sleeve extending circumferentially around the pipe are exposed to an outwardly directed pressure during one cycle of operation of the processing vessel and are exposed to an inwardly directed pressure when the process vessel is operated during a reverse cycle of operation. Such pressure reversals tend to bend and thus eventually break the screen.

Thus, the principal object of the present invention is to provide a new and improved fluid feed conduit for processing apparatus.

Another object of the present invention is to provide a new and improved fluid feeding conduit which consists of a perforated feed pipe and a fine-mesh sleeve.

Briefly, the above and further objects may be realized in accordance with the present invention by providing a feed conduit which includes a helically convoluted, rigid tube having an external helical groove in which a series of orifices are disposed at precisely determined positions within the groove and a fine-mesh sleeve surrounding the pipe. Where the sleeve is formed of wires, the wires extend at an angle of 45° relative to the longitudinal axis of the pipe so that when the sleeve is placed over the pipe and an external pressure is applied thereto the wires bend to conform to the shape of the tube, whereby during the operation of the processing vessel the pressure reversals and the weight of the resinous material do not cause excessive wearing and tearing of the sleeve. If a wire-screen sleeve were disposed over a corrugated tube in the conventional manner, i.e., with one set of wires extending longitudinally and the other extending circumferentially, the circumferential wires would be subject to a compressive force and would not hold in place during the pressure reversals encountered during use of the conduit.

These and further objects of the present invention will be understood more fully and completely from the following detailed description when considered with reference to the accompanying drawings, wherein.

Figure 1:
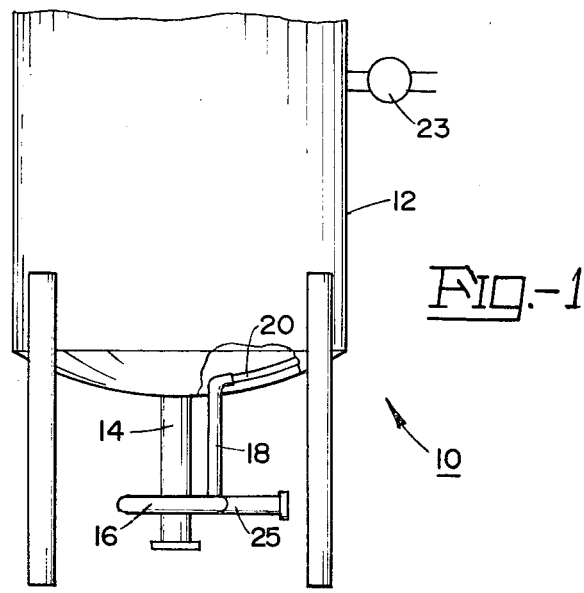
FIG. 1 is a fragmentary front elevational view of a processing vessel which has a portion thereof broken away to expose a fluid feed conduit incorporating principles of the present invention.

Referring now to the drawings and more particularly to FIG. 1 thereof, there is shown a processing system 10 which incorporates the principles of the present invention. Since there are many other different types of processing systems which may incorporate the principles of the present invention, the processing system disclosed herein is only included by way of example, The system 10 includes a process vessel 12, a material feed pipe 14 communicating with the interior of the vessel 12 at the lowermost area of its dish-shaped bottom wall, and an annular manifold 16 surrounding the pipe 14 for conveying processing fluid under pressure to and from the vessel 12 via a connecting pipe 18, which extends into the interior of the vessel 12 and is connected in fluid communication with a perforated fluid feed conduit 20 extending along and in close proximity with the bottom wall of the vessel 12. It will be understood that a plurality of such pipes 18 and conduits 20 will normally be provided in the vessel 12 in most installations. An outlet 23 is connected in fluid communication with the vessel 12 near its top for feeding liquids to the material in the vessel 12 when the conduit 20 serves as an underdrain, and for removing liquids from the vessel 12 when the conduit 20 conveys fluid into the vessel 12. The vessel 12 can be opened to the atmosphere, or it can be provided with a cover (not shown) to seal the vessel chamber so that the vessel 12 can be operated at pressures exceeding atmospheric pressure. A two-way pump (not shown) pumps the processing fluid under pressure to and from the manifold 16 via a pipe 25. Normally a plurality of connector pipes and fluid feed conduits are connected in fluid communication to the manifold 16, but for sake of clarity, only one connector pipe and fluid feed conduit are shown in the drawing. In operation, the processing system 10 can function in different manners since as an ion exchange system for purifying water by passing it through powered or granulated resinous ion exchange materials, or as a regenerating system for the resinous ion exchange material. The apparatus of the present invention will be described in connection with the system 10 being used as a regenerating system, but since the invention can also be used in many other types of systems, it should be understood that the invention should not be limited to a regenerating system.

When the system 10 is used to regenerate resinous material, the spent resinous material is transferred from an ion exchange system (not shown) to the sealed vessel 12 via the material feed pipe 14. The first step in the regeneration operation is the backwash operation. In this regard, in order to quickly break apart these sticky resinous materials to permit regenerating fluid to flow through the material, a fluid such as water under high pressure is pumped to the material in the vessel 12 via the pipe 25, the manifold 16, the connector pipes, such as the pipe 18, and the feed conduits, such as the feed conduit 20. The water flows upwardly through the material and out of the vessel 12 via the line 23. Thereafter, the regenerating fluid under pressure enters the vessel 12 via the line 23 which opens therein above the resinous material. The regenerating fluid flows down through the resinous material, causing it to be regenerated, and out of the vessel 12 via the conduits 20, the connector pipes, the manifold 16 and the pipe 25. Further details of the system 10 are disclosed in the above-mentioned U. S. Pat. No. 3,391,707.

Figure 2:
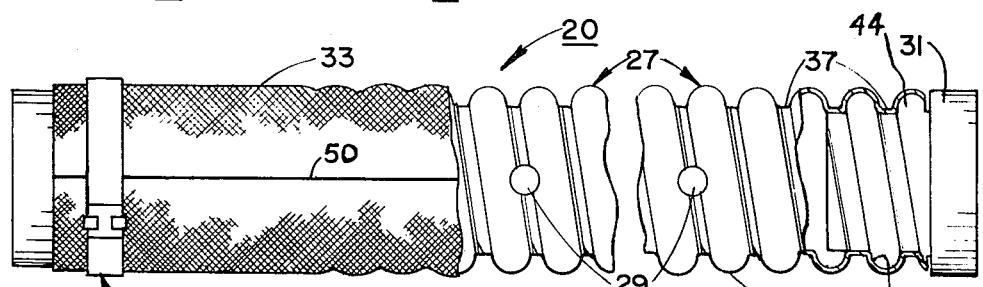
FIG. 2 is an enlarged, fragmentary view, partially in cross section, of the fluid feed conduit of FIG. 1.
Figure 3:
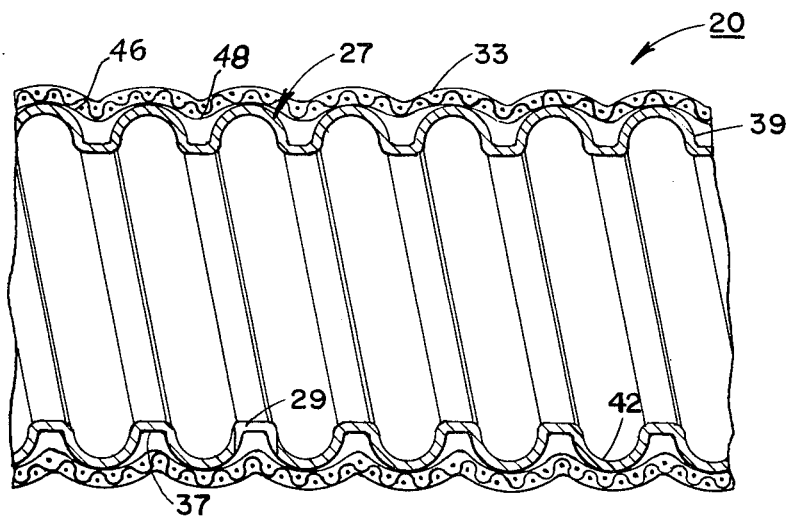
FIG. 3 is an enlarged fragmentary cross-sectional view of the conduit of FIG. 2.

As shown in FIGS. 2 and 3, the fluid feed conduit 20 comprises a helically convoluted, rigid tube 27 having a series of longitudinally aligned holes or orifices 29 therein extending in a line parallel to the longitudinal axis of the tube 27 at precisely determined positions in the external groove 37 to ensure uniform distribution of liquids. The free end of the tube 27 is closed by a plug member 31, and a fine-mesh sleeve 33 surrounds the tube 27 with its ends fixed to the tube 27 by a pair of bands 35. Inasmuch as the groove 37 is continuous, should any of the orifices 29 become blocked, liquid may flow from the area of the blocked orifices to other orifices which remain open. Hence, better zone pickup is maintained irrespective of some orifice blinding.

A helical external ridge 39 extends along the tube 27 for substantially the entire length thereof and forms the external groove 37. An internal helical groove 42 is also defined by the ridge 39, and mates with the threads 44 on the plug member 31 so that the plug member 31 can be threaded into the end of the pipe and thus secured in place. The sleeve 33 partially conforms to and engages the external ridge 39 on the tube 27, and has an internal helical groove 46 which receives the ridge 39 to fix the sleeve 33 to the tube 27. An internal helical ridge 48 extends partially into the external groove 37 in the tube 27 and holds the sleeve 33 against the tube 27 to prevent longitudinal relative movement therebetween. It may be seen, however, that the internal ridge 48 does not fill the groove 37 which thus provides a passageway to permit fluids to flow in the groove 37 between the tube 27 and the sleeve 33.

The sleeve 33 is preferably composed of a wire-mesh material which has its mesh wires extending at a 45° angle relative to the longitudinal axis of the tube 27 as shown in FIG. 2. The feed conduit 20 of the present invention can be assembled by placing the sleeve over the tube 27 and then compressing the sleeve to form the internal ridge 48 so as to fix the sleeve 33 to the tube 27. The step of forming the sleeve onto the tube 27 is best accomplished automatically after the conduit is installed in a pressurized vessel. If desired, however, the sleeve can be compressed against the tube 27 during the initial manufacturing process. It will be apparent to those skilled in the art that the use of a woven mesh wherein the filaments extend in a helical direction along the tube is also advantageous where the tube is annularly convoluted rather than helically convoluted. In FIG. 3, the sleeve 33 is shown to be oversized for illustration purposes, and while the conventional patent drafting symbol for screening is used for the sleeve 33 to indicate that the sleeve 33 is composed of screening, it should now be understood that the sleeve 33 incorporates a novel design, in that, among other things, the mesh wires of the sleeve 33 extend in a helical direction at a 45° angle relative to the longitudinal axis of the sleeve 33.

In order to assemble the filter element 20, the sleeve 33 is first formed by cutting a piece of wire mesh screen material at a 45° bias, and then forming the piece into a tubular sleeve by welding it along a seam 50. The tubular sleeve is slipped over the tube 27, and a pair of bands, such as the band 35, are used to secure the ends of the tubular sleeve to the tube 27 and to the plug member 31. If it is desired to preform the sleeve 33 prior to installation in a processing vessel, the unit may then be mounted in a turning machine, such as a lathe, and a suitable tool (not shown) inserted around the unit. The tube 27 is then turned about its longitudinal axis to cause the tool to move along the element 20 and thus to bend a helical portion of the sleeve into the external groove 37, whereby the sleeve is partially stretched and conformed in place on the tube 27. Due to the orientation of the mesh wires, all of the wires are stretched and the sleeve 33 retains its tightened condition on the tube 27. Moreover, the assembled conduit 20 can be slightly bent to conform to the shape of the bottom wall of the vessel 12 without loosening the sleeve 33.

While the present invention has been described in connection with a particular embodiment thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

What is claimed is:

1. For use in processing apparatus of the type which includes a processing tank for containing materials to be processed and at least one conduit disposed within the interior of said tank, said conduit including a closed-end, helically convoluted tube having at least one aperture therein, said tube having an external helical groove, said aperture being disposed at the innermost portion of said groove; and a metal mesh sleeve surrounding said tube and including an internal, helical ridge portion extending partially within said groove to fix said sleeve to said tube so that said tube and said sleeve form an integral unit.

2. The invention according to claim 1, wherein said external groove in said tube extends substantially the length of said tube.

3. The invention according to claim 2, wherein said mesh sleeve is composed of a woven material, said material being composed of elongated interwoven members extending at an angle of substantially 45 degrees relative to the longitudinal axis of said tube.

4. The invention according to claim 1, further including a plug member having a threaded portion, said threaded portion being complementally shaped relative to said internal groove of said tube and said threaded portion being threaded into one end of said tube to form said closed end.

5. The invention according to claim 1 wherein is provided:

a plurality of apertures in said tube opening in the bottom portions of said groove, said tube is thin walled and includes an internal helical groove, and said mesh sleeve is formed by interwoven filaments each extending in a helical direction along said tube.

6. The invention according to claim 5 wherein said filaments are metallic.

7. The invention according to claim 5 wherein:

said mesh consists of two sets of said filaments, the filaments in one of said sets being perpendicular to the filaments in the other of said sets.

8. The invention according to claim 3 wherein said interwoven members are metallic.

* * * * *